Figure 1:
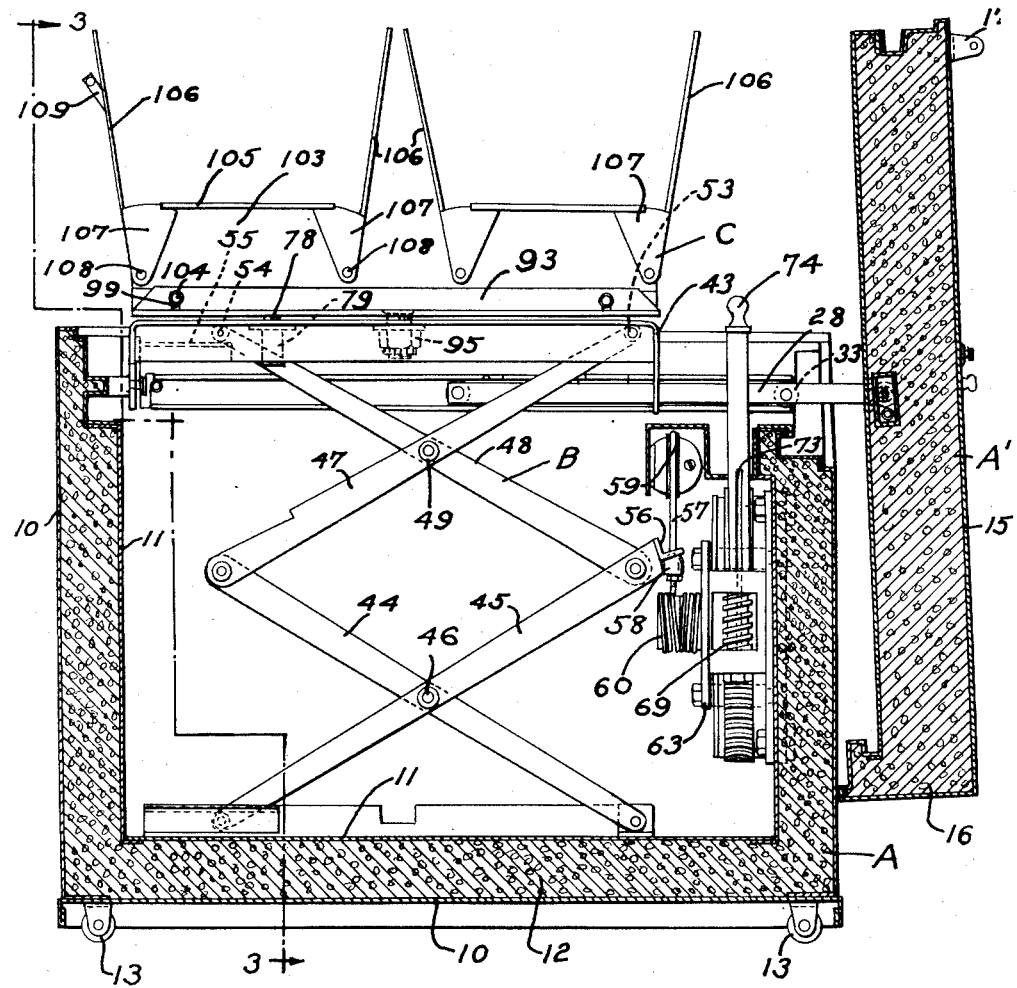

May 26, 1942.  W. C. MILLER ET AL  2,284,531
LEDGER SAFE AND THE LIKE
Filed Dec. 2, 1937   11 Sheets-Sheet 1

INVENTORS.
WILLIAM C. MILLER
BY EARL BOUGHTON
Chritton, Wiles, Davies, Hirschl & Dawson
ATTORNEYS.

May 26, 1942.  W. C. MILLER ET AL  2,284,531
LEDGER SAFE AND THE LIKE
Filed Dec. 2, 1937  11 Sheets-Sheet 2
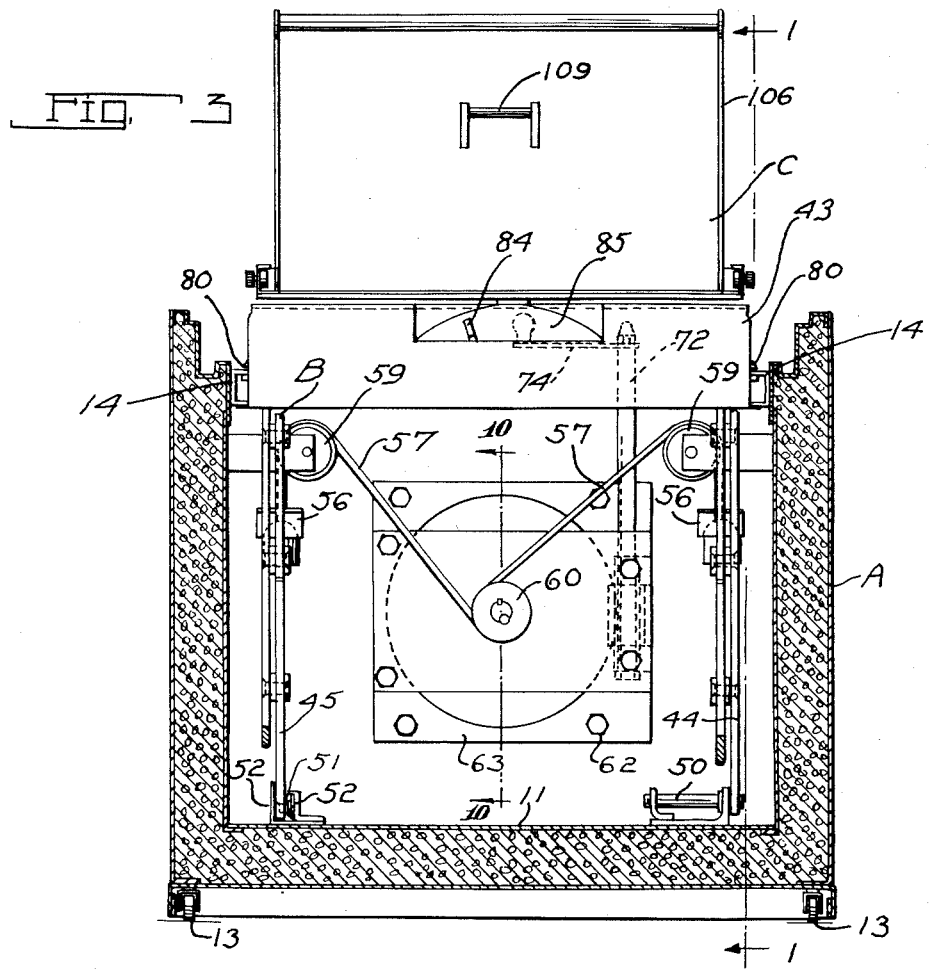
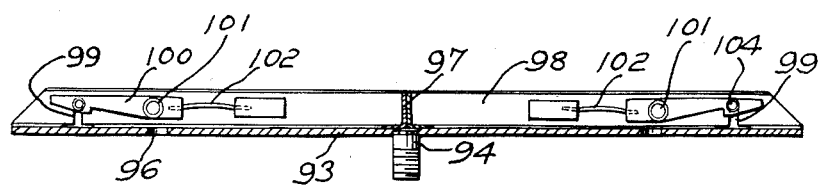
INVENTORS.
WILLIAM C. MILLER
BY EARL BOUGHTON
Chritton, Wiles, Davies, Hirsch, & Dawson
ATTORNEYS.

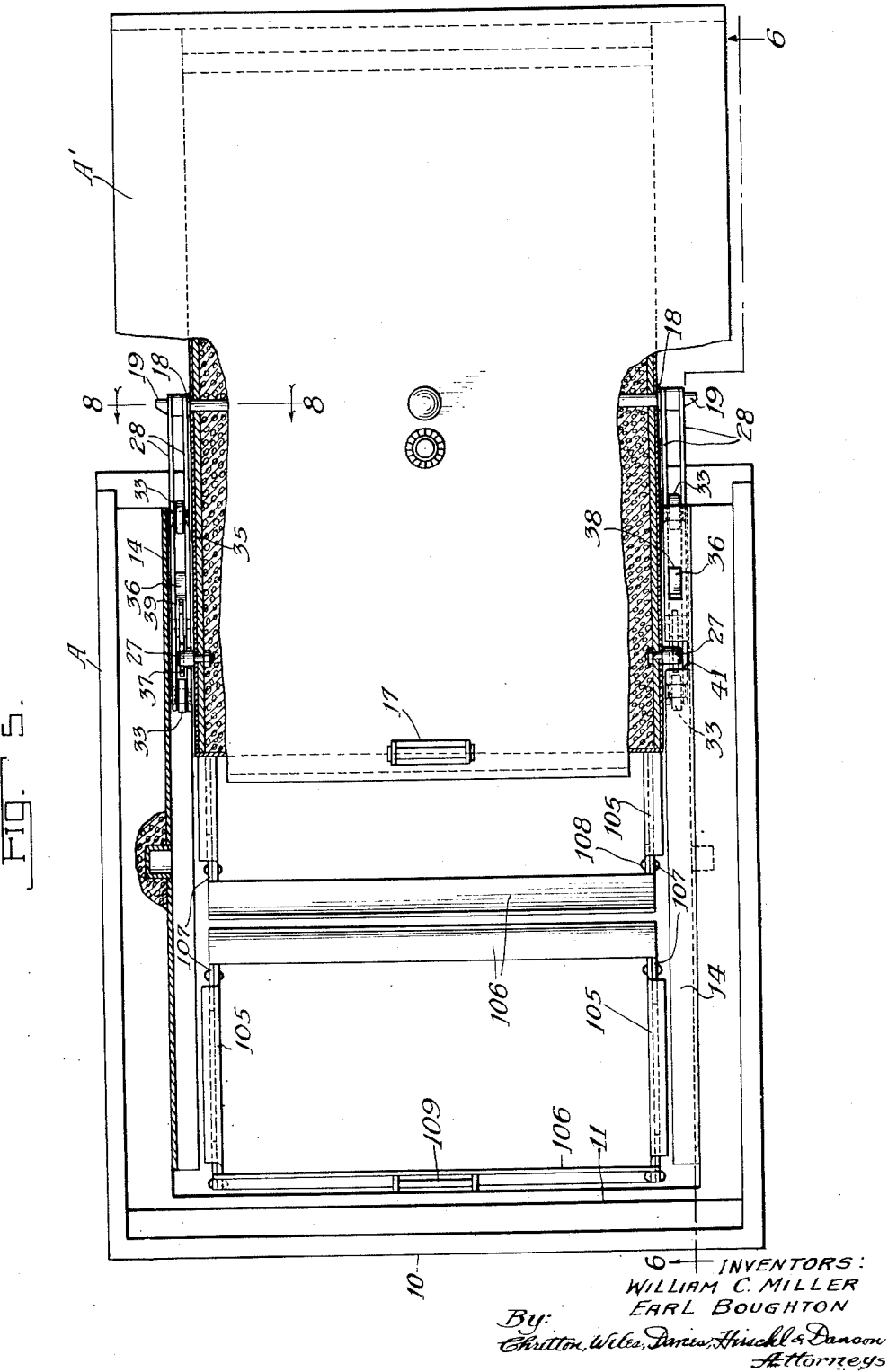

May 26, 1942.                    W. C. MILLER ET AL                    2,284,531
                                LEDGER SAFE AND THE LIKE
                      Filed Dec. 2, 1937           11 Sheets-Sheet 4
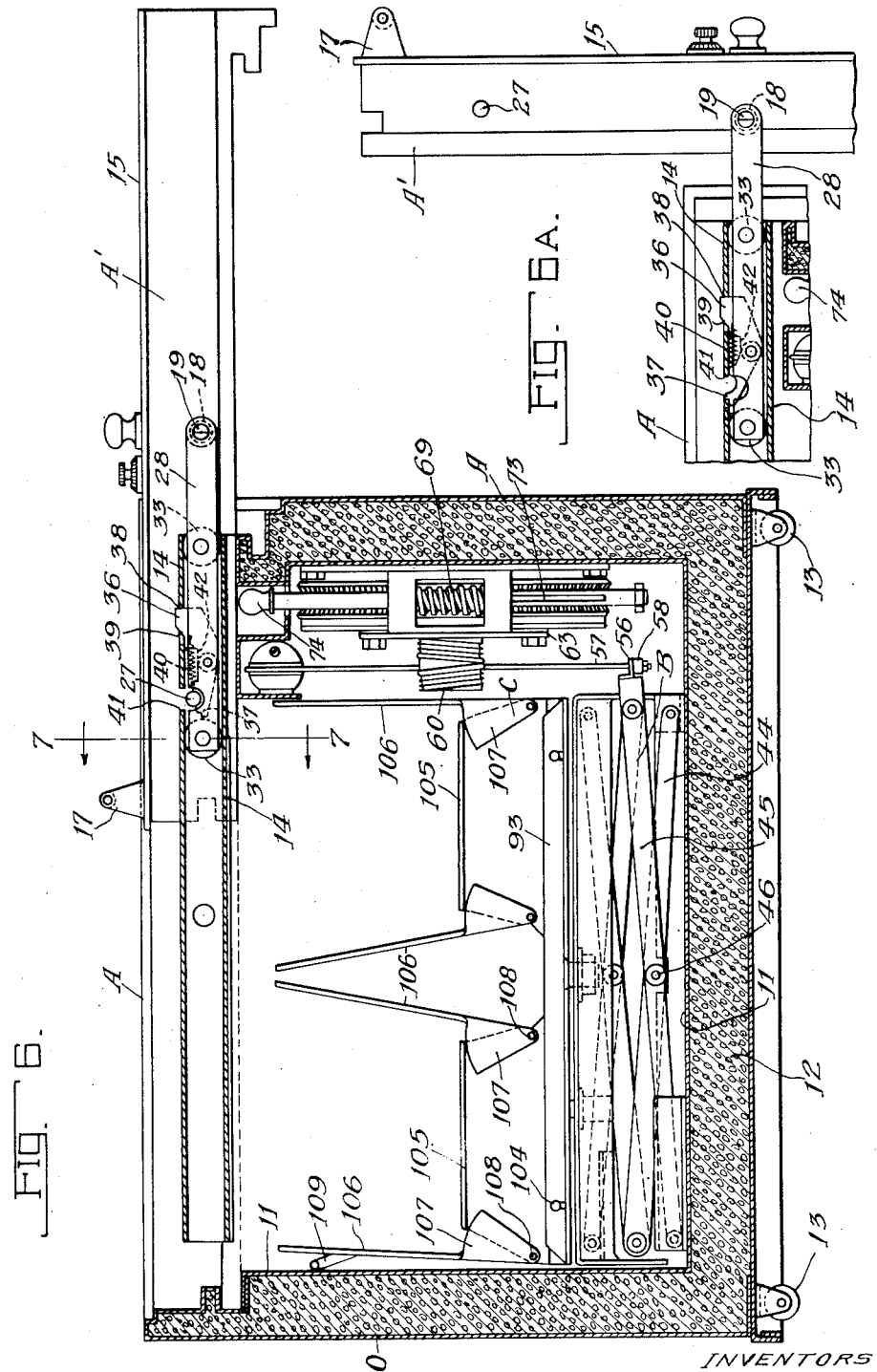
INVENTORS:
WILLIAM C. MILLER,
EARL BOUGHTON
By Chritton, Wiles, Davies, Hinckle & Davis
Attorneys

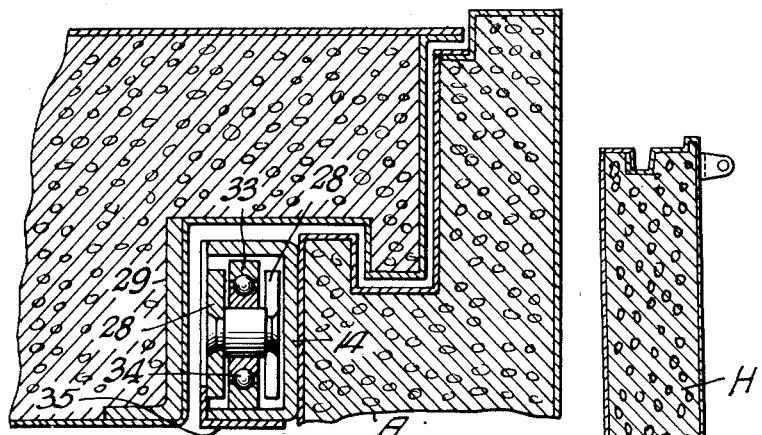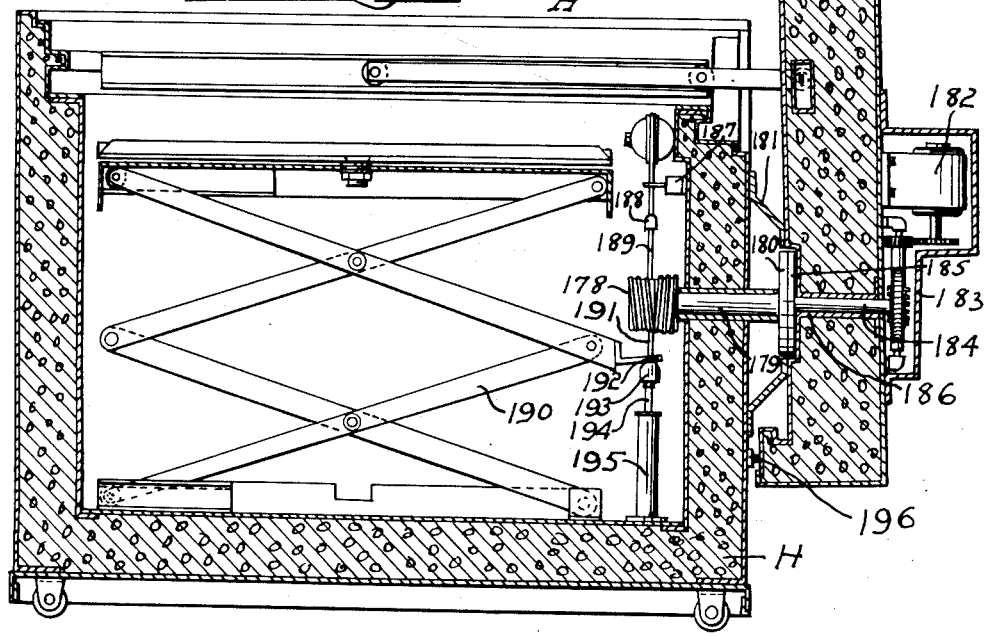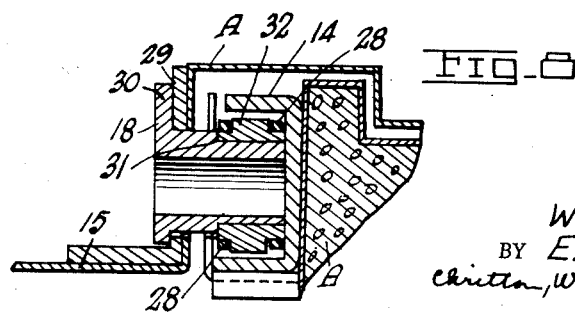

May 26, 1942. W. C. MILLER ET AL 2,284,531
LEDGER SAFE AND THE LIKE
Filed Dec. 2, 1937 11 Sheets-Sheet 6
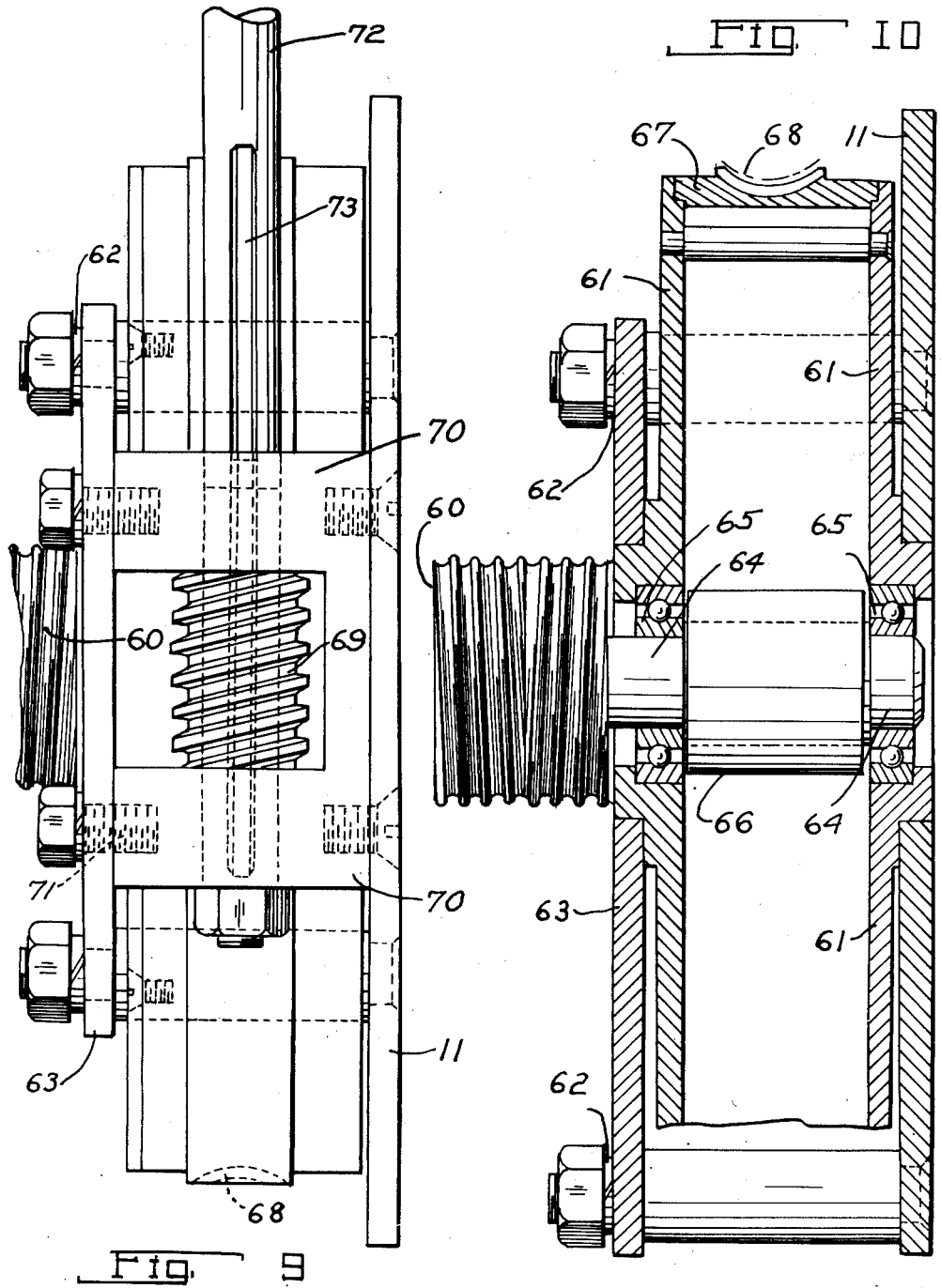
INVENTORS.
WILLIAM C. MILLER
BY EARL BOUGHTON
Chritton, Wiles, Davies, Hirsch & Dawson
ATTORNEYS.

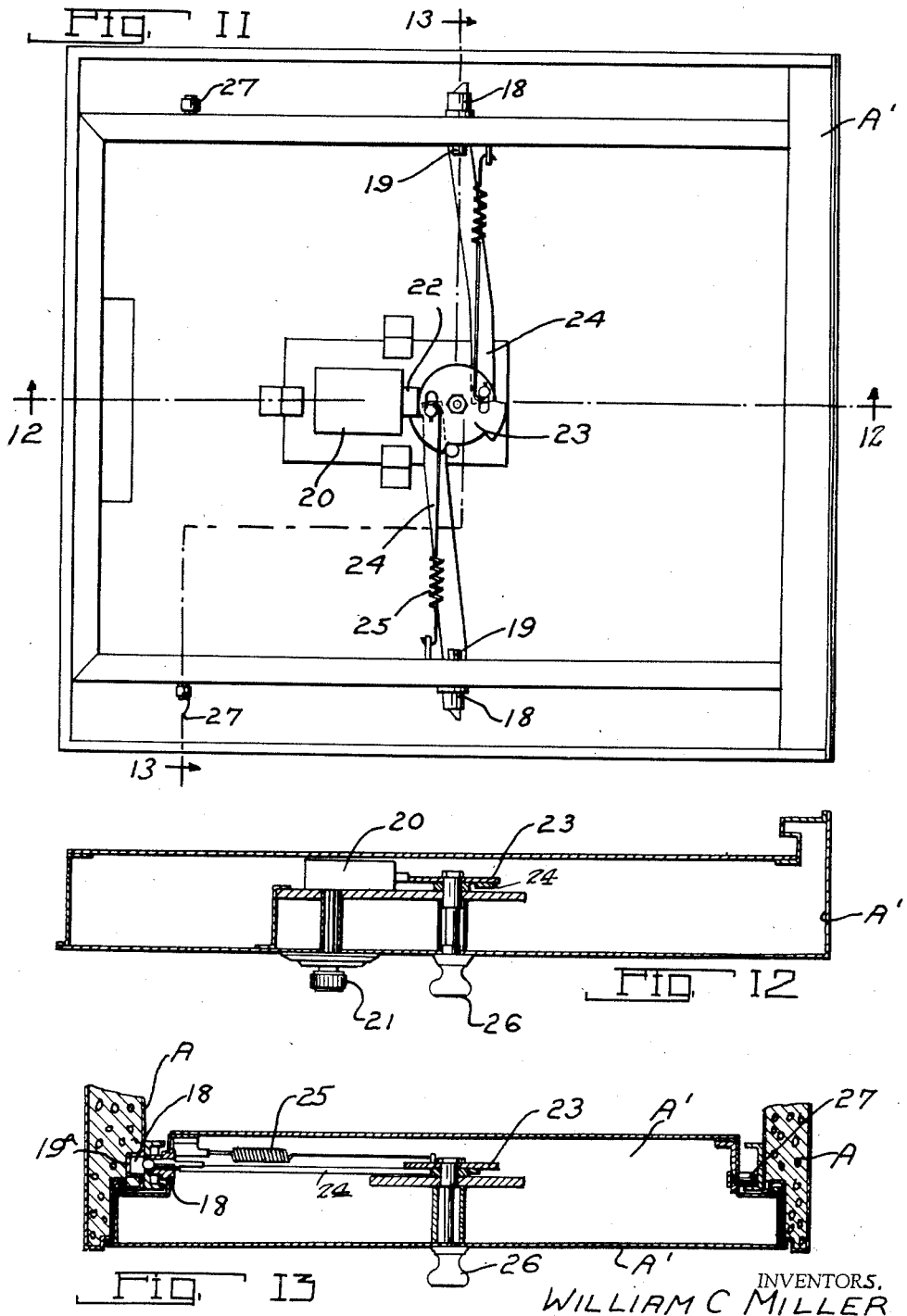

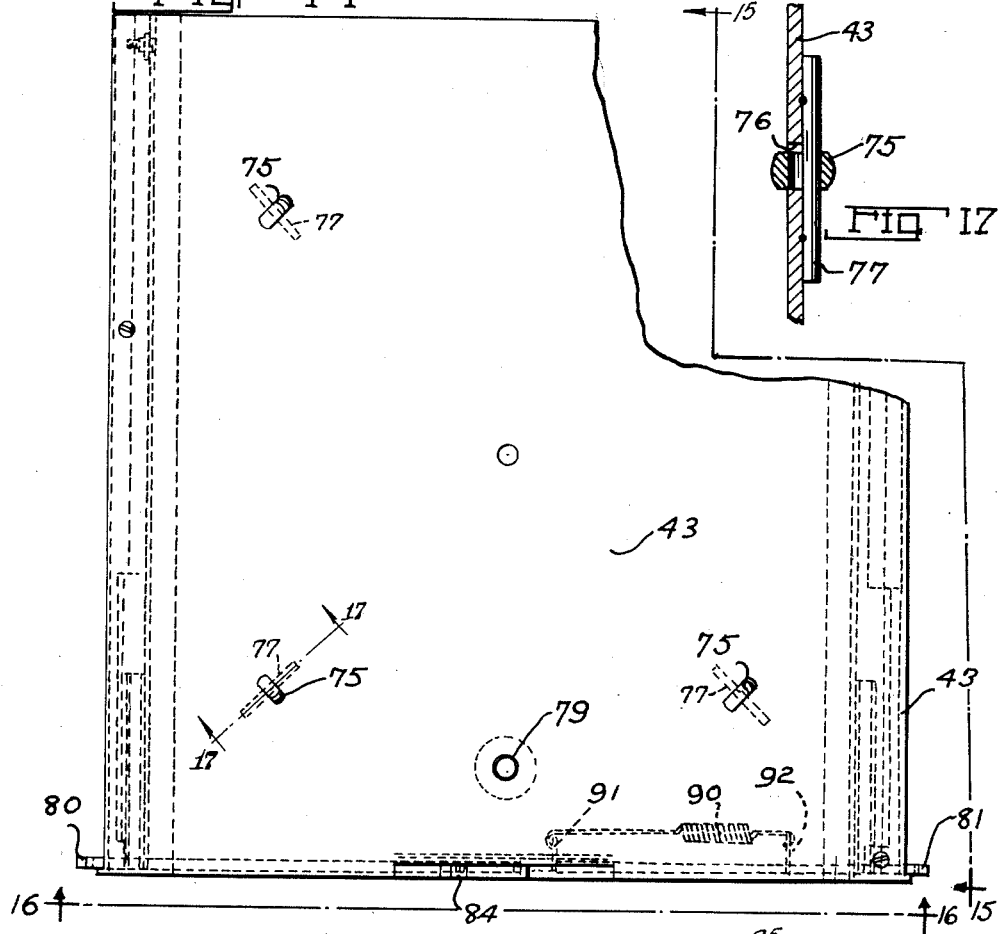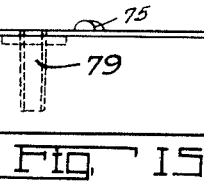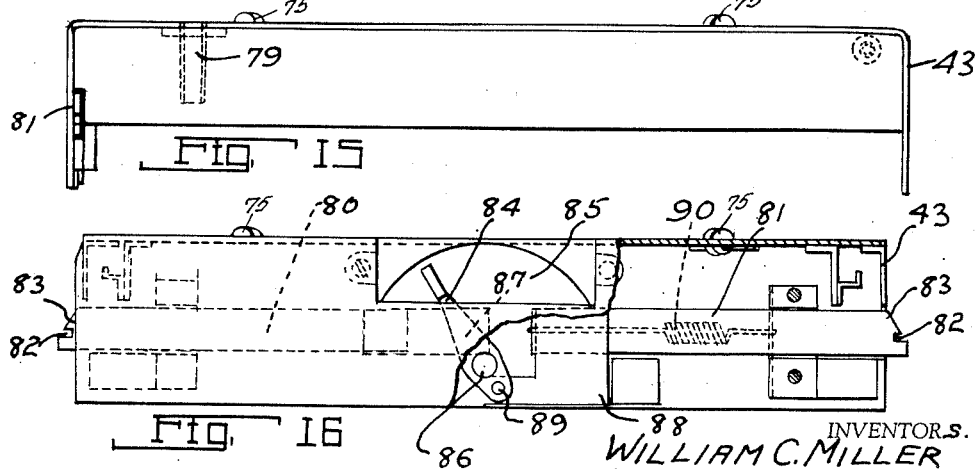

May 26, 1942.    W. C. MILLER ET AL    2,284,531
LEDGER SAFE AND THE LIKE
Filed Dec. 2, 1937    11 Sheets-Sheet 9

INVENTORS.
WILLIAM C. MILLER
BY EARL BOUGHTON
Chritton, Wiles, Davies, Hirsch & Dawson
ATTORNEYS.

May 26, 1942.  W. C. MILLER ET AL  2,284,531
LEDGER SAFE AND THE LIKE
Filed Dec. 2, 1937  11 Sheets-Sheet 11

INVENTORS
WILLIAM C. MILLER
BY EARL BOUGHTON
Chritton, Wiles, Davies, Heinell & Dawson
ATTORNEYS.

Patented May 26, 1942

2,284,531

UNITED STATES PATENT OFFICE 2,284,531

LEDGER SAFE AND THE LIKE

William C. Miller and Earl Boughton, Canton, Ohio, assignors to Diebold Safe & Lock Co., Canton, Ohio, a corporation of Ohio Application December 2, 1937, Serial No. 177,806

10 Claims. (Cl. 45—2)

This invention relates to a ledger safe and the like. It is useful in connection with any vertical safe structure in which expansible or rotatable file supporting structures are employed.

It has heretofore been the practice to provide counterbalancing mechanism by which file supports may be lifted nearly to the top of a safe structure, the weight of the closure usually being employed as the counterbalance for raising the file support. With this type of structure, it is usually necessary to remove the contents of the safe in order to have ready accessibility to the files and other contents.

The present invention contemplates a safe structure in which the contents thereof are elevated to a position above the well of the safe and are so supported as to be readily expanded or rotated into a position greater than the contour of the safe well, in which position the files or other contents of the safe may be manipulated as effectively and even more effectively than they would be if placed upon a separate table. A further object of the invention is to provide improved mechanism for raising and lowering the expansible files and for maintaining the same in desired positions. A still further object is to provide cooperating closure means for housing the files and elevating mechanism, the closure means being supported, when closed, in effective protecting position and, when open, in a convenient position away from the files. Other specific objects and advantages will appear as the specification proceeds.

Figure 2:
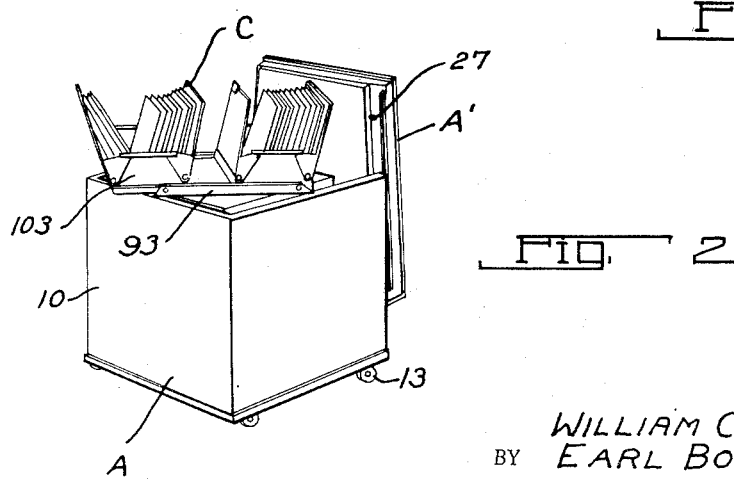
Figure 18:
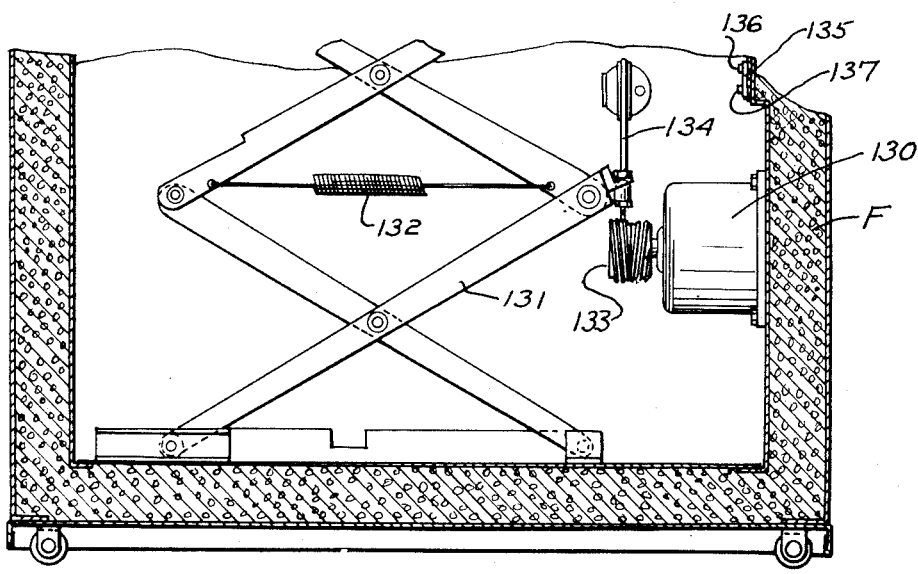
Figure 19:
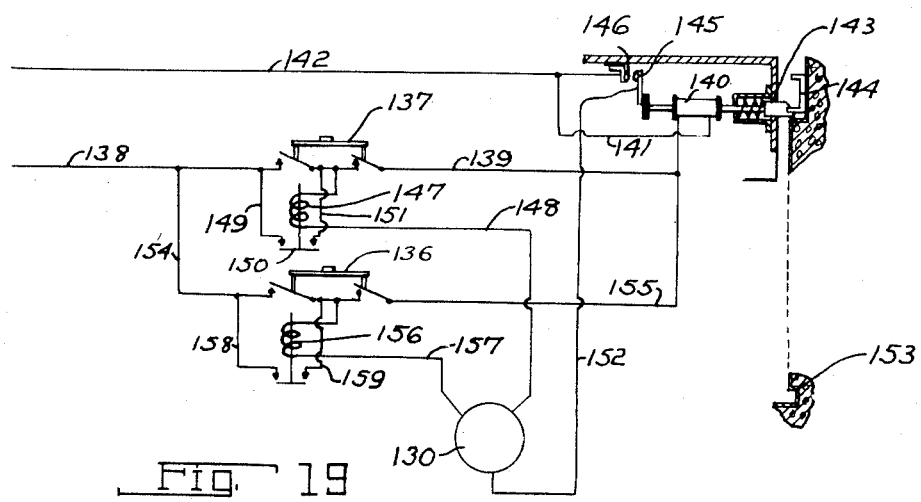
Figure 20:
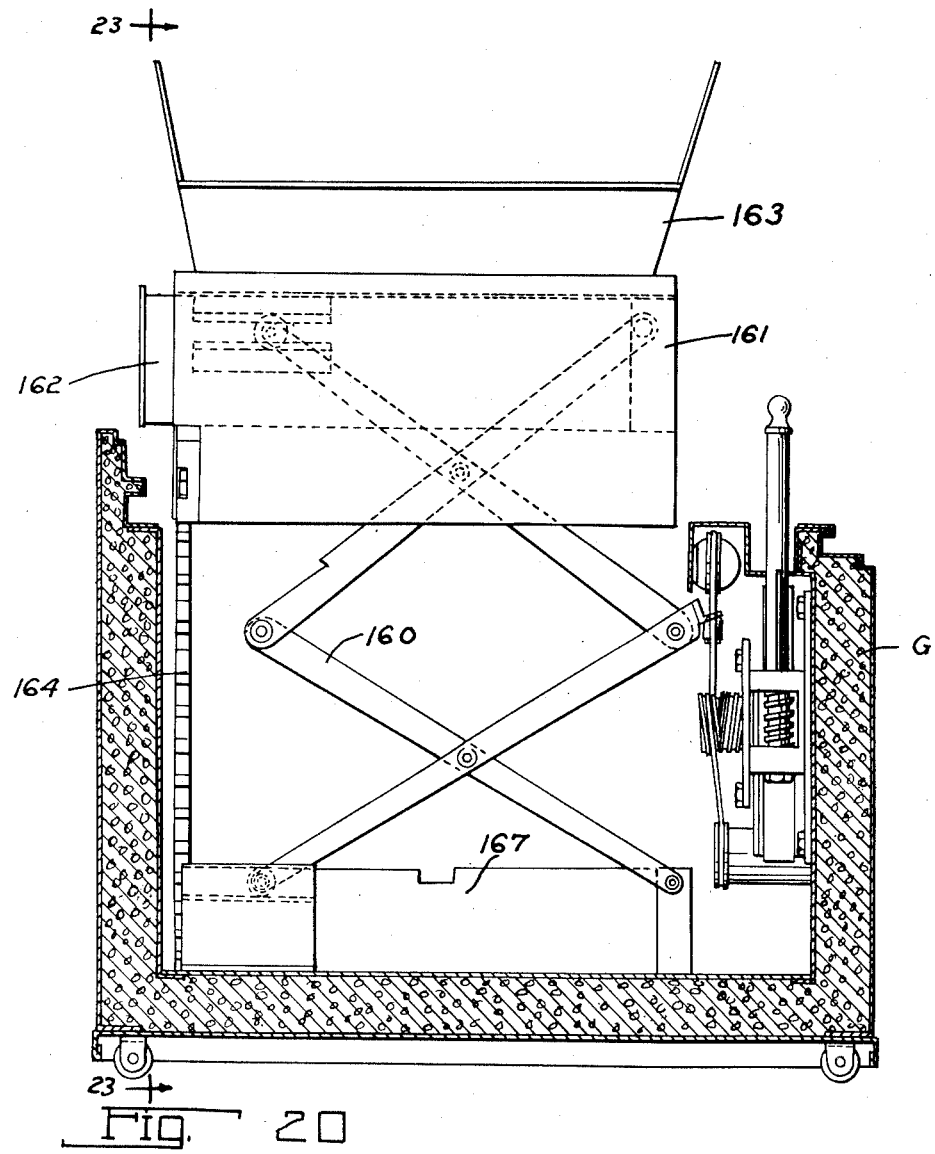
Figure 21:
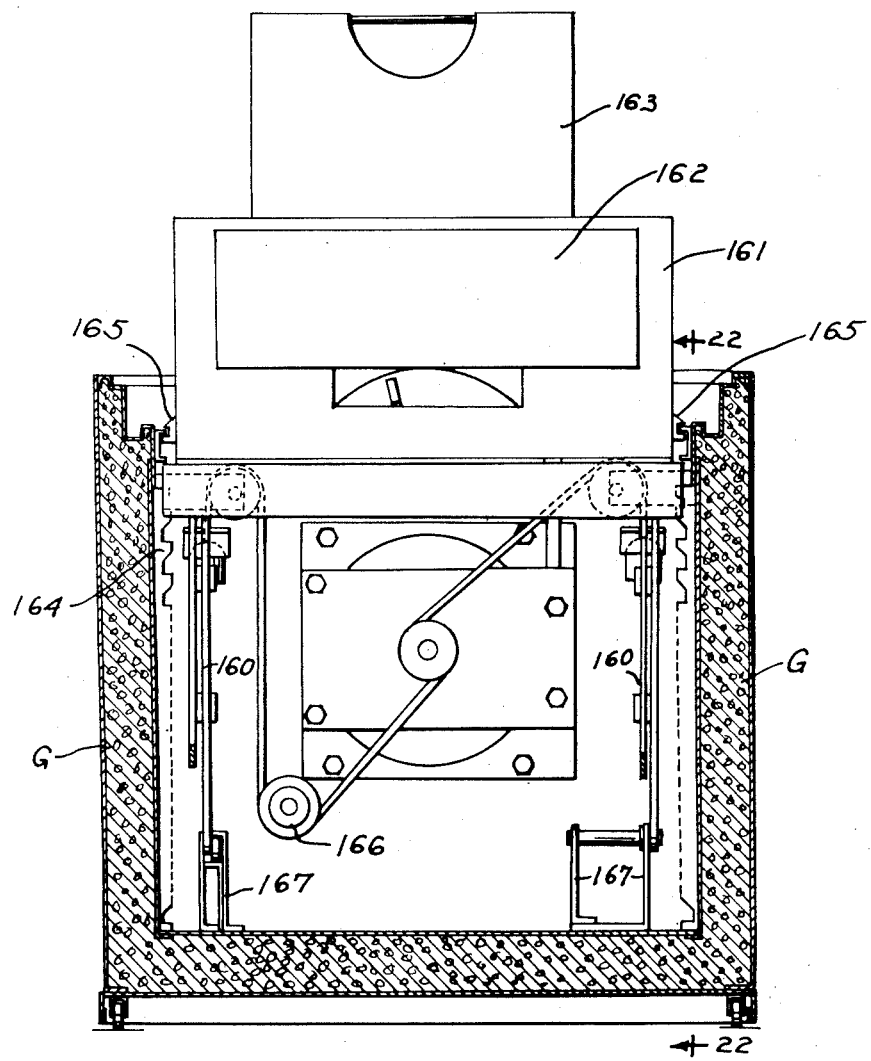

The invention is illustrated, in preferred embodiments, by the accompanying drawings, in which Figure 1 is a longitudinal sectional view of the safe and mechanism associated therewith embodying our invention, the section being taken as indicated at line 1—1 of Fig. 3; Fig. 2, a perspective view of the structure, the ledger tray or card support being rotated to a position extending beyond the contour of the well of the safe; Fig. 3, a transverse sectional view, the section being taken as indicated at line 3—3 of Fig. 1; Fig. 4, a sectional detail view of the supporting table or tray support; Fig. 5, a broken enlarged plan view of the ledger safe and showing link and roller supporting mechanism for the door or closure; Fig. 6, a sectional view, the section being taken as indicated at line 6—6 of Fig. 5; Fig. 6A, a broken part sectional view showing the door in vertical position; Fig. 7, a broken sectional detail view, the section being taken as indicated at line 7—7 of Fig. 6; Fig. 8, a broken sectional detail view, the section being taken as indicated at line 8—8 of Fig. 5; Fig. 9, a broken enlarged side view of the spring drum and the worm for tensioning the spring; Fig. 10, a sectional view of the power spring case, the section being taken as indicated at line 10—10 of Fig. 3; Fig. 11, a bottom plan view of the locking bolt structure with which the top closure is equipped; Fig. 12, a sectional detail view, the section being taken as indicated at line 12—12 of Fig. 11; Fig. 13, a sectional detail view, the section being taken as indicated at line 13—13 of Fig. 11; Fig. 14, a broken top plan view of the platform which is raised and lowered within the well of the safe; Fig. 15, a side view in elevation, the view being taken as indicated at line 15—15 of Fig. 14; Fig. 16, a broken front view in elevation, the view being taken as indicated at line 16—16 of Fig. 14; Fig. 17, a broken sectional detail view, the section being taken as indicated at line 17—17 of Fig. 14; Fig 18, a sectional view of a modified form of raising mechanism in which an electric motor is employed; Fig. 19, a schematic view of the wiring layout employed in the structure shown in Fig. 18; Fig. 20, a sectional view, on line 22—22 of Fig. 21, of apparatus employed for raising elevated mechanism, the apparatus being substantially like that shown in the preferred form, the elevated parts supporting a card index as well as a file tray; Fig. 21, a sectional view taken as indicated at line 23—23 of Fig. 20; and Fig. 22, a sectional view similar to Fig. 18 but showing a modified form of electric raising mechanism.

The main parts and functions of the structure contemplated in the present invention may be summarized briefly as follows. A safe having a vertical well therein is equipped with a closure member which may be slid to one end thereof and then tilted into a vertical and out-of-the-way position. Within the well of the safe is provided mechanism for raising and lowering a platform on which are carried rotatable or expansible file supports. The lifting or lowering mechanism may be positive, that is, a power mechanism may be used for accomplishing the raising and lowering; or the raising and lowering may be partly manual, the weight of the files being accurately counterbalanced by spring or other mechanism; or the lifting mechanism may consist of automatic means for raising the platform part way, manual means being employed for lifting it the remainder of the way. Of course, many other arrangements may be employed for facilitating the raising and lowering of the platform. Upon the platform is supported an expansible tray support. The support may expand by rotating it so that a portion of the tray extends beyond the walls of the safe, or it may be expanded by drawing out slidable members or hinged members so that portions of the tray extend beyond the walls of the safe. In this position, the files are readily accessible and the platform serves as a table, so that the work can be done without removing any of the tray supports from the device. At the same time, the expanding or rotating of the parts permits the tray to be operated with great ease and effectiveness. For example, after consulting the cards on one side of a file, the operator may rotate the tray support to bring another portion of the file immediately in front of her. Likewise, the trays can be drawn close to or pushed away from the operator without making it necessary for the operator to move. When the operation is completed, the expanded parts are rapidly collapsed to their original compact position and the tray support thus made to conform to the contour of the well whereby it may be rapidly lowered into its protected position within the well. The closure can then be drawn to locking position.

Referring more specifically to the structure illustrated in Figs. 1 to 16 inclusive, A designates a safe casing equipped with a closure A'; B designates raising and lowering mechanism; and C, file or tray supports which may be lifted out of the well and expanded or rotated to the desired positions and then contracted for lowering within the well.

The safe structure A may be of any suitable type or construction. In the illustration given, a sheet metal inner shell 11 is provided, the space therebetween it and the shell 10 being filled with any suitable filling 12 of refractory, fire-resistant material, such as, for example, a suitable cement composition. The safe is shown supported upon rollers 13. The safe is provided with suitable configurations at its rear sides to provide an interlock with matched configurations of the safe door A'. As shown more clearly in Fig. 3, the safe is provided at its inner upper sides with channel bars or guides 14 adapted to receive rollers by which the door A' is supported.

The safe door A' is preferably constructed similarly to the safe A having a casing 15 filled with a similar cement composition 16 or other suitable filling material. It is provided at its forward end with a handle 17. It is also provided at a point intermediate its length with hollow trunnions 18 by which it is adapted to be supported when rotated to the vertical position shown in Fig. 1. Extending through the hollow trunnions 18 are locking bolts 19 which are adapted to engage aligned recesses 19ª in the walls of safe A for locking the door in position when the door is drawn to closed position. The closure A' is also provided with an ordinary combination lock 20 which is operated by the usual dial knob 21. The combination lock 20 controls a bolt 22, which in turn dogs the rotatable plate 23 equipped, as shown more clearly in Fig. 11, with eccentric pivoted slides 24, the slides or levers 24 being connected to the bolts 19. Such locking structure being old and well known in the art, a further detailed description is believed unnecessary. A spring 25 is employed for maintaining the bolts 19 in normally extended or locking position so that when the door is drawn to closed position, the bolts 19 will immediately slide into the locking recesses in casing A when they become aligned with said recesses. The locking plate or disk 23 is controlled by a suitable handle or knob 26 which extends on the outer side of the door A' adjacent the dial 21. At its forward side, the closure A' is provided with a roller-equipped pin 27 which is adapted to engage the guide channel 14 with which safe A is provided so as to maintain the closure A' in horizontal position.

The door A' is supported upon roller-equipped link mechanism which will now be described. The hollow trunnion 18, which is secured to the door of closure A' and through which extends the latching bolt 19, is carried by a pair of parallel links 28, as shown more clearly in Fig. 6. The metal wall 15 of the door A' is reinforced with a heavy metal liner 29 engaged by flange 30 of the hollow trunnion 18, as shown more clearly in Fig. 8. As shown more clearly in Fig. 8, the hollow trunnion 18 is reduced at 31 to receive the annular ring 32, the ring 32 being recessed at its corners to receive the supporting members 28.

The links 28, on each side of the safe, extend rearwardly and are provided with a pair of spaced rollers 33, as shown more clearly in Figs. 5 and 7. The rollers 33 are supported upon ball bearings 34, as shown more clearly in Fig. 7.

In order to retain the link members 28 within the U-shaped guide 14, we provide an angle iron retaining member 35, as shown more clearly in Fig. 7. The link mechanism just described supports the door A' in the rear vertical position shown in Fig. 1, while at the same time enabling the door A' to be moved easily into horizontal position, as illustrated in Fig. 6.

We provide suitable mechanism for limiting the outward movement of the links while at the same time providing means for releasing such limiting means. Such latching means are shown more clearly in Figs. 5 and 6. They consist of a pair of pivotally connected members 36 and 37, the member 36 having its front portion adapted to engage a slot 38 in the guide 14 so as to stop the links 28 in the position shown in Fig. 5. It will be observed that the member 36 has on its rear side a concave or beveled portion 39 which causes the member 36 to be drawn downwardly when the links 28 move rearwardly. It will be understood that the pivot connecting the members 36 and 37 extends through the two link members 28 so that the latch mechanism travels with the links or slides 28. The latch member 37 extends upwardly under the force of a connecting spring 40 through a slot 41 in the guide 14 so as to lock the slides 28 against rearward movement. The latter latch 37 is released by engagement with the roller-equipped pin 27 with which the door is provided near its forward end. Thus when the door A' is pressed downwardly to horizontal position, the member 27 depresses the latch 37 to break its engagement with the slot 41, thus permitting the slide 28 to be drawn rearwardly. In such rearward action, the concave wall 39 of latch 36 causes latch 36 to be depressed. The two latch members 36 and 37 may be connected in any suitable way. In the illustration given, the latch 37 is in the form of a flat metal strip received within bifurcations of latch 36 and pivotally secured therein and to the extension slides 28 by means of pivot pin 42. Spring 40 draws both members upwardly toward their respective locking slots.

The raising and lowering mechanism B may be of any suitable construction. In the illustration given, in Figs. 1 to 17 inclusive, a platform member 43, which carries the file supporting devices C, is mounted for vertical movement upon parallel extension links. As shown in the drawings, the extension links comprise the lower links 44 and 45 pivotally connected at 46 and the upper links 47 and 48 pivotally connected at 49. The lower portion of link 44 is pivotally connected to a fixed shaft 50 which is supported by brackets secured to the bottom lining 11 of the safe A. The other lower link 45 has its bottom portion secured to a roller member 51 confined between roller guides 52, the guides 52 being formed by a pair of angle bars welded or otherwise secured to the bottom lining, as shown more clearly in Fig. 3. The top link 47 has its upper end secured to a fixed pivot 53, while the upper link 46 has its upper end secured to a roller member 54 slidably secured within guides 55. The extension guides upon the opposite sides of the safe, as shown in Fig. 3, are identical except that they are reversed in position with respect to the fixed and movable pivot points for the guides.

Each of the links 45 is provided with a flange 56 which is provided with a perforation through which extends the flexible member 57. The lower end of the flexible member 57 is secured within a rounded nut 58. Each of the flexible members 57 extends over an adjacent pulley 59 and the end of each flexible member is secured within grooves carried by the driving drum 60 by spot welding or other means. The flexible members 57 may be formed of stranded wire or other suitable sturdy and flexible material. It will thus be seen that upon rotation of drum 60, the flexible members can be shortened in length or lengthened so as to elevate or lower the extension guides.

Any suitable means may be employed for driving the drum 60. A spring motor may be used for this purpose. If desired, an electric motor may be used. Also, if desired, manually operated mechanism may be employed with driving drum 60. In the illustration given, in Figs. 1 to 17 inclusive, a spring motor is employed. The spring is housed within a motor casing 61 which is secured to the lining 11 of the safe by means of bolts 62, as shown more clearly in Fig. 10, the casing 61 being engaged by metal straps 63 and the metal straps being engaged by the bolts 62. The driving drum 60 is mounted on a shaft 64 of reduced diameter, the shaft 64 being journaled within ball bearings 65 carried by casing 61. An inner drum 66 is fixed to shaft 64 and lies between the bearings 65. The spring within the casing may be of the band type secured to the inner drum 66, the other end being secured to the annular winding ring 67, ring 67 being provided exteriorly with a worm rack 68. Any suitable means for engaging the rack 68 for driving the winding ring 67 may be employed. As shown more clearly in Fig. 9, a worm 69 is rotatably mounted in bracket supports 70 fixed by means of bolts 71 to the lining 11 on one side and plate 63 on the other side. The worm 69 is hollow and receives a vertically extending winding shaft 72 which is provided with a key 73 engaging a corresponding groove in the worm 69. By this means, shaft 72 may be raised or lowered while still being in engagement with worm 69. The upper end of the shaft 72 is provided with a winding handle 74.

In order to prevent the winding ring 67 from rotating under the force of the spring, we use threads of such pitch, both in worm 69 and gear rack 68, as to frictionally engage and prevent such movement. Other suitable means may be employed. The handle 74, when dropped to lowermost position by sliding shaft 72 downwardly through the hollow gear 69, may be employed to engage lugs preventing rotation of the handle and thereby rotation of the winding gear or ring 67.

The platform 43 is preferably provided with rollers 75 which facilitate the rotation of the parts thereabove. As shown more clearly in Figs. 14 and 17, the rollers 75 are confined with the slots 76 of platform 43 by means of short rods 77, the rods 77 being spot welded to the top of platform 43. Also, the platform is preferably provided with a ball locking member 78 which is normally urged in an upward direction by a spring housed within tube 79. The ball is adapted to be brought into engagement with depressions carried by members thereabove so as to releasably lock the members in position.

Any suitable latching means may be employed for latching the platform 43 in raised position. In the illustration given, the platform 43 is provided at its front with spring actuated and outwardly extending latch bars 80 and 81, each of the bars being provided at its outer end with a slot 82 and a cam surface 83. The latch members are adapted to engage the upper edge of the track member 14, as shown more clearly in Fig. 3, in order to lock the platform in raised position. The latch bars are slidably guided in the front portion of platform 43 and are actuated by a lever 84 which is accessible at its upper end through slot 85. The lever 84 is pivoted, as shown more clearly in Fig. 16, at 86. Bar 80 is pivoted to the lever 84 at 87. Latch bar 81 is provided with a depending extension 88 which is in turn pivoted to lever 84 at 89. The latch bars are urged outwardly by the spring 90 which engages flange 91 with which bar 81 is equipped and the fixed flange 92 secured to the platform 43.

The mechanism C may be of any suitable construction. In the illustration given, it comprises a table member 93 which is pivotally supported upon platform 43 by means of pivot stud 94. The lower threaded end of stud 94 is engaged by a lock nut 95. Table 93 is provided with spaced recesses 96 adapted to receive the spring pressed locking ball 78 carried by the platform 43. In the specific table shown, a partition 97 is formed in the central portion of the table, as shown more clearly in Fig. 4, and the table is also provided with side walls 98, the walls being slotted at the points indicated by the numeral 99. Latch bars 100 are secured to the sides 99, being pivoted at the point 101. A spring 102 is supported in engagement with the latch 100 so as to maintain it normally with the latch 100 in down position in which the latch engages slots in the floor of the withdrawable tray supports 103. The latch members 100 are each provided with a button 104 extending through the slot 99. Thus the latches 100 may be raised so as to disengage the tray section 103 and permit it to be drawn forward until the latch engages the next slot therein. When it is desired to return the section 103 to its former compact position, it is simply slid rearwardly, the cam surface of the latch 100 permitting it to reach its former position and to be there secured in position by engagement with the latch. It will be understood that the details of construction of the card or file support may be modified widely. In the specific form of tray illustrated, the sections 103 are provided at their top with overhanging flanges 105. The card supports 106 are carried by sector members 107, the sector members being pivoted at 108 to the sides of the members 103, as shown more clearly in Fig. 1. The sectors 107 permit the members 106 to be swung inwardly and outwardly to a limited extent, the upper surfaces of the sector members 107 being brought into engagement with flanges 105 to limit the swing of the sector members 107 and card supports 106. To facilitate the raising of the device, we provide a handle member 109 which is secured to the front member 106.

*Operation*

In the operation of the device, assuming that the safe is closed and locked, the combination knob 21 is operated to release bolt 22. Handle 26 is then turned to withdraw the bolts 19 which engage recesses 19ᵃ in the casing A. The door A' is then moved rearwardly until the roller pin 27 reaches the slot 41 in the guide 14, the stop 36 preventing further backward movement. The door may then be lifted upwardly to allow it to swing to the open position shown in Fig. 1, the door being supported upon hollow trunnions 18.

The platform 43 carrying the file supporting mechanism C may now be raised in either of two ways. The spring winding handle 74 may be elevated and rotated to tension the spring to the point that the spring itself will drive drum 60 and through the flexible members 57 lift the extension members and the platform carried thereby. We prefer, however, to have the spring tensioned only to the point at which it substantially counterbalances the weight of the burden supported by the platform 43. With this arrangement, after the door A' has been opened to the position shown in Fig. 1, it is merely necessary for the operator to grasp handle 109 and to pull upwardly, this slight force being sufficient to raise the platform and files. Should the files be increased or diminished, the operator can tension the spring so as to just about balance the weight of the files and supporting structure therefor. It is preferred to have the spring tensioned to the point where the files will come to rest slowly in the lower part of the well, the force of the spring being, however, sufficient to aid materially in raising the file supporting structure.

As soon as the platform 43 with the file supporting structure C has reached its elevated position, it is locked in this position by the spring actuated latch arms 80 and 81 which engage the upper flange of the guide 14. In this position, the file support table is rotated to a convenient position and, when desired, one of the sections 103 is extended upon raising latch member 100. In the use of the card supporting tray mechanism C, the table may be rotated a number of times and the sections 103 extended and contracted.

When the file structure C is to be again returned to the safe, the sections 103 are pushed into contracted position and the table 93 is rotated to a position in which it can be readily drawn into the well of the safe. The latch bars 80 and 81 are then released by moving the lever 84, as shown in Fig. 16, to the right. The weight of the files and supporting structure being sufficient to slightly overcome the force of the spring, the platform 43 and the file structure C thereabove sink slowly into the well, coming to rest below the top surface thereof. The cover A' is next drawn downwardly and forwardly so that the roller-equipped pin 27 engages the latch 37. The door is drawn still further inwardly so as to bring the roller pin 27 under the guide 14.

At the same time, the cam surface 39 of the stop 36, which halted the outward movement of the links 28, causes the latch 36 to move downwardly underneath the guide channel 14. The door A' is now maintained in the horizontal position by engagement of roller 27 with the guide 14 and is drawn toward the forward end of the safe, bringing the inner locking configurations of the door and safe together. In this position, the locking bolts 19, which are normally urged outwardly by the spring 25, slip into the locking recesses 19ᵃ. The combination lock is turned so as to dog the plate 23 and to prevent withdrawal of the bolts 29 until the combination is again set for unlocking and the bolt 23 withdrawn.

In the foregoing description of the structure shown in Figs. 1 to 17 inclusive, it will be observed that there are at least two structures which may be modified greatly without changing the invention. For example, any form of rotating, withdrawable or otherwise expansible file or card supporting structure may be employed. In other words, a great range of card or file supports may be employed in the present invention without departing from the spirit thereof.

In addition, it will be understood that many different types of power means for raising and lowering the inner structure may be substituted for the spring motor shown. In the following portion of the specification, we will describe at least two forms of power means, one being an electric motor and the other utilizing a weight counterbalance and manually operated means.

In the modification shown in Figs. 18 and 19, the safe F is provided on its interior with a motor 130. The link mechanism 131 is substantially the same as that heretofore described except that a spring 132 is employed as shown. The motor drives a grooved drum 133 which is identical with that heretofore described and which in turn operates the flexible members 134 which are identical with those heretofore described. At the upper rear side of the safe, a switch block 135 is supported containing two spring pressed button switches 136 and 137. When the upper button 136 is pressed, the motor drives drum 133 to raise the links 131 and the platform and structure C supported thereby. After the platform has reached its upper position, it is automatically latched in that position and the motor is cut off. When the platform is to be lowered within the safe, button 137 is pressed which drives the reversible motor 130 in the opposite direction so as to lower the structure.

Referring to the schematic showing in Fig. 19, the current passes through line 138 and, when button 137 is depressed, through line 139, through the solenoid 140, and thence back through line 141 and line 142. The solenoid 140 draws the latch 143 out of engagement with guide 144 and at the same time moves the contact 145 against contact 146. Current can now pass through the line 138, switch 137, solenoid 147, and thence through line 148 to motor 130, causing the motor to turn in the direction necessary for lowering the platform. Should the spring pressed button 137 now be released, since the operation of solenoid 147 connects lines 149 and 151, the current still flows to the motor 130 through line 138, line 149, switch 150, and back to switch 137 through line 151. Then the current follows the old course through the solenoid winding 147 and line 148 to the motor. From the motor the current passes through line 152 to contact 145 and through contact 146 back through line 142. While the spring-pressed button is depressed, the operation of the motor 130 causes the mechanism supporting the latch 143 to move downwardly and the side wall of the case causes the plunger to be maintained in its initial position, thus holding contacts 145 and 146 in engagement. When the spring-pressed button 137 is released, the current flow through the solenoid 140 is discontinued since line 137 is now open and the solenoid ceases to function. However, the contacts 145 and 146 are maintained in engagement because of the inner lining of the casing which engages the latch member 143. When the spring pressed latch 143 reaches the lower position, it is snapped into latching position within recess 153 and breaks the contact between the members 145 and 146 which are carried by the platform. Thus the current flow to the motor 130 stops.

The operation with respect to switch 136 is identical except that the motor is caused to turn in the opposite direction so as to lift the platform. The current passes from line 138, through line 154, through switch 136 and line 155 to the solenoid 140, thus causing the latching member 143 to be retracted and the contact between points 145 and 146 to be made. Current now flows through line 154, switch 136, solenoid winding 156 and line 157 to motor 130. From the motor 130 the current flows through lines 152, contacts 145 and 146 and back through line 142. The operation of solenoid 136 connects lines 158 and 159, causing the current to flow steadily to the motor after the spring pressed button 136 has been released, as described above in connection with switch 137.

The modification shown in Figs. 20 and 21 merely illustrates the utility of the mechanism already described in the modification shown in Figs. 1 to 17 inclusive. In this modification, the safe G is provided with link mechanism 160 which lifts a card drawer case 161 to a position out of the well of the safe. In this position, the inner drawer 162 can be withdrawn beyond the limits of the safe so that the operator can examine the cards while still held and supported by the case 161. Upon the case 161 is supported a card tray 163. The safe G is provided on its inner side with a series of locking notches 164 by which the card case 161 can be supported in any desired position within the safe by bringing the latching bars 165 into engagement with the desired notch. Thus, if desired, the card case 161 can be dropped to position within the well while still leaving the expansible tray 163 outside of the well. The tray may be rotatably mounted and may be extensibly mounted as desired. If desired, additional pulleys 166 may be employed for guiding and controlling the movement of the mechanism in its upward and downward direction. In order to get the additional height desired in connection with the drawer case 161 and tray 166, the link mechanism 160 is supported upon elevated brackets 167. Also, the upper link member is connected directly to the casing 161 rather than to a platform therebelow. In other words, the drawer casing 161 is itself utilized as a supporting platform for carrying the card tray 163 thereabove, the drawer casing 161 being so supported as to be elevated to the position shown in Fig. 20. The spring motor mechanism is identical with that heretofore described in connection with Figs. 1 to 17 inclusive.

In the modification shown in Fig. 22, the safe H is provided with a door H'. The driving drum 178 is mounted on a shaft 179 journaled in the wall of safe 18 and is provided at its rear side with a friction plate 180, the plate being enclosed by the metal members 181. The door H' is provided with a motor 182 housed within motor casing 183. The motor drives through the gear and worm connections the shaft 184 which is provided at its inner end with a friction plate 185. Shaft 184 is supported within the shaft casing 186. The motor is connected to a limit switch 187 of well-known construction which is adapted to be operated for breaking the current by the lug 188 carried by one of the actuating or raising elements 189. The parallel guide members 190 are of the construction heretofore described and need not be described again in detail. The flexible element 191 extends through the flange 192 secured to one of the members 190 and the nut 193 below the flange is secured to the stem 194 of a cushioning member 195 which prevents rapid descent of the links 194. The usual oil or liquid shock-absorber device may be employed or, if desired, springs, etc., may be employed.

In the operation of the device, the door H' is swung to the rear position shown in Fig. 3, thus bringing friction plate 185 into contact with friction plate 180. The motor drives the shaft 184 in but one direction and causes shaft 129 and the drum 178 to rotate so as to raise the parallel members 190 and thus elevate the turntable. When the turntable has reached its upper limit, the member 188 strikes the limit switch 187 and causes the motor to stop after the turntable is above the well of the safe and in a position whereby the members carried by it may be expanded beyond the limits of the well. To lower the tray, it is only necessary to pull the door forward so as to separate the friction clutch disks 180 and 185. The weight of the material carried by the tray causes the tray and other parts to descend into the well of the safe, the speed of the fall being retarded by the oil check 195. Thus, in case of fire or other emergency, it is only necessary for the user to draw the door to closed position, the lowering of the tray being automatic. Starting of the motor for raising the tray is likewise automatic, the lower portion of the door, when swung to the vertical position shown in Fig. 20, contacting the starter switch 196 and thus setting the motor in operation.

While in the foregoing specification, we have set forth three modifications for raising and lowering a platform or file device out of the well of a safe to permit its expansion and while we have also shown a number of illustrative expansible devices, it will be understood that a great variety of modifications may be employed to carry out the purpose and objects of the invention, such modifications and changes being obvious to those skilled in the art.

We claim:

1. In combination, a safe having a door adapted to be moved to one side thereof, supporting structure vertically movable within the well of said safe, means for raising said supporting structure including a rotatable mounted member extending through a side of said safe and provided with a disk plate, and motor driven means carried by said door and including a driven clutch plate adapted to be brought into engagement with said first-mentioned plate when said door is moved to a position to the side of the safe.

2. In combination, a safe having a door adapted to be moved to one side thereof, supporting structure vertically movable within the well of said safe, means for raising said supporting structure including a rotatable mounted member extending through a side of said safe and provided with a disk plate, motor driven means carried by said door and including a driven clutch plate adapted to be brought into engagement with said first-mentioned plate when said door is moved to a position to the side of the safe, and automatic means for starting and stopping said motor after the supporting structure has been moved from lower to raised position.

3. In a structure of the character set forth, a safe providing a vertical well, lazy tongs secured within said safe and providing supporting members, a file support carried by said members, flexible members engaging said lazy tongs, pulleys mounted in the upper portion of said safe and receiving said flexible members, and motor means supported in said safe below said pulleys for exerting tension upon said flexible members tending to elevate said supporting members.

4. In a structure of the character set forth, a safe providing a vertical well, lazy tongs secured within said safe and providing supporting members, a file support carried by said members, flexible members engaging said lazy tongs, pulleys mounted in the upper portion of said safe and receiving said flexible members, a drum below said pulleys and receiving said flexible members, and motor means for rotating said drum for exerting tension upon said flexible members tending to elevate said supporting members.

5. In a structure of the character set forth, a safe providing a vertical well, lazy tongs secured within said safe and providing supporting members, a file support carried by said members, flexible members engaging said lazy tongs, spring motor means for exerting tension upon said flexible members tending to elevate said supporting members, and means for changing the tension of said spring motor.

6. In a structure of the character set forth, a safe providing a vertical well, lazy tongs secured within said safe and providing supporting members, a support member carried by said members, flexible members engaging said lazy tongs, pulleys supported in the upper portion of said safe and receiving said flexible members, a grooved drum supported for rotation within said safe to which drum said flexible members are connected, and means tending to rotate said drum for exerting tension upon said flexible members.

7. In a structure of the character set forth, a safe providing a vertical well, lazy tongs secured within said safe and providing supporting members, an expansible file support carried by said supporting members, flexible members engaging said lazy tongs, pulleys mounted in the upper portion of said safe and receiving said flexible members, and motor means for exerting tension upon said flexible members tending to elevate said supporting members above said safe.

8. In a structure of the class set forth, a safe providing a vertical well, a supporting device, extension members carrying said supporting device and mounted within said safe so that their motion has at least a component thereof in a vertical direction, guides within said well for constraining said members to travel in a vertical path to a position above said well, pulleys mounted in the upper portion of said safe, flexible members received through said pulleys and adapted to exert tension upon said support to elevate the same, and motor means for exerting tension upon said flexible members to elevate said support.

9. In a structure of the class set forth, a safe providing a vertical well, guide members within said safe, a file support, extension members carrying said file support and constrained to travel in a vertical path by said guide members, pulleys mounted in the upper portion of said safe, flexible members received by said pulleys and engaging said extension members, and motor means for exerting tension upon said flexible members to elevate said file support above said safe.

10. In a structure of the class set forth, a safe providing a vertical well, guide members secured within said safe and equipped with lazy tong extension members, a support carried by said extension members and guided thereby for vertical movement, flexible members engaging said extension members and adapted to draw the same upwardly, and motor means mounted within said well for exerting tension upon said flexible members to elevate said support device.

WILLIAM C. MILLER.
EARL BOUGHTON.